Patented Dec. 2, 1952

2,620,288

UNITED STATES PATENT OFFICE 2,620,288

ADHESIVE COMPRISING A MIXTURE OF A NUCLEATED AND NONNUCLEATED PHENOLIC RESINS

Paul G. Schrader and Alexander M. Partansky, Antioch, Calif., assignors to The Dow Chemical Company, Midland, Mich., a corporation of Delaware No Drawing. Application August 15, 1949, Serial No. 110,466

18 Claims. (Cl. 154—45.9)

This invention relates to resins of the phenol-aldehyde type which are useful in the manufacture of adhesives for plywood and for similar purposes. The present improvements are particularly concerned with new water-soluble phenol-formaldehyde resins which, when mixed with resins of similar type known to the art, form a mixed resin having in the cured state an improved resistance to water. Such mixed resins can be used successfully as adhesives for gluing veneers of higher moisture content than is feasible in present commercial practice.

The use of phenolic adhesives is well established in the plywood industry. Numerous formulations for such adhesives have been disclosed in the prior art, such as those described in United States Patents Nos. 2,150,698, 2,360,376, 2,437,981 and 2,457,493. While such known adhesives are satisfactory for gluing "dry" veneers having a moisture content of less than about 3 to 4 per cent, they cannot be reliably employed with "wet" veneers having a moisture content as high as 6 to 10 per cent. With the latter, blisters develop on hot-pressing, or even complete failure to form a bond, under the usual conditions of temperature and pressing time which are employed in plywood manufacture.

In the manufacture of plywood the veneer panels are kiln-dried to a low moisture content, on the order of 0 to 4 per cent, before the adhesive is applied to their surfaces. It is a problem in production line operation to hold the moisture content of the kiln-dried panels consistently within the desired limits, due to variations in the moisture of the undried veneers, or of atmospheric humidity, or other causes. When, as may happen at times, the veneers are discharged from the drier with too high a moisture content, mill operation may be badly dislocated and losses occur due to interrupted operation or to the production of defective plywood.

It is an object of this invention to provide an adhesive which can be employed successfully for gluing veneers having a wider range of moisture content than can be tolerated in present mill practice with the commercial adhesives now available. Such gain in adaptability to wet veneers should be secured without sacrifice of properties when the improved adhesive is employed with dry veneers. In other words, the object is to provide a satisfactory adhesive for use with both dry and wet veneers to produce plywood of quality equal to commercial specifications.

According to the invention our improved adhesive is composed of two separate and distinct water-soluble phenolic resins, which are to be mixed prior to use. The two resins are designated as (1) a "catalytic" or activated resin and (2) a "base" resin, which differ from each other in the range of proportions of their constituent elements, but more particularly in their manner of preparation.

THE CATALYTIC RESIN

The catalytic resin is prepared by reacting a reactive phenol and aqueous formaldehyde or alcoholic para-formaldehyde in alkaline medium, or initiating the reaction in acid medium and completing it in alkaline medium, at a temperature sufficient to cause reaction but below 70° C., and preferably at a resin solids concentration of about 30 to 40 per cent. A reactive phenol is one which contains no substituents in either the ortho or para position to the hydroxy group. Mixtures of such reactive phenols, or consisting predominantly of the same, may also be used. The reaction is faster when initiated in an acid medium than in an alkaline medium, but when an acid medium is used in this way, caustic alkali is added after phase separation occurs but prior to formation of alkali-insoluble resin and the condensation is completed under alkaline conditions. The amount of alkali so added is sufficient to produce in the mixture an alkalinity approximately equal to that obtained by carrying out the reaction from the beginning in an alkaline medium of suitable strength.

The mol ratio of formaldehyde to the phenol should be between 2.25 and 3.5 mols $CH_2O$ per mol of phenol. The peculiar properties of this resin are not obtained in measurable degree if less than 2.25 mol proportion is used, while more than 3.5 mols is an excess of the reactable proportion. When the reaction is carried out in alkaline medium, alkali metal hydroxide, e. g. sodium hydroxide, is added to the reaction mixture in proportion of 0.5 to 1.0 mol per mol of phenol. The materials, phenol, aqueous formaldehyde and aqueous alkali metal hydroxide, are mixed in desired proportions within the limits just stated, and the mixture is cooked at a temperature below 70° C., preferably about 60° C., until a suitable viscosity, on the order of 10 to 350 centipoises, or more, is attained, when measured at 25° C. in aqueous solution at 30 per cent solids concentration. If necessary, water may be added during the reaction or to the reaction product to adjust the resin solids content of the same to from 30 to 40 per cent. The time of cooking will vary with the ratio of formaldehyde to phenol, and with the selected phenol. When phenol itself is used the reaction time with alkali catalyst may vary from 40 to 50 hours or more at a CH₂O/phenol ratio of 2.5, while at a ratio of 3.5 the time will be reduced to about 15 to 20 hours. When the phenol used is meta-cresol, under otherwise similar conditions, the reaction time is on the order of 12 to 16 hours at a CH₂O/cresol ratio of about 2.5.

The preparation of the nucleated resin with the alkali included in the starting materials, as shown above, requires an extended cooking time at temperatures below 70° C. The time can be greatly shortened, if the condensation reaction is initiated with a mineral acid catalyst, e. g. hydrochloric acid or sulphuric acid, and then completed with the alkaline catalyst. In this way the resin is advanced in the acid stage at a temperature below 70° C. to a point short of that where it becomes alkali-insoluble, and then alkali is added in amount sufficient to neutralize the acid and produce an alkali concentration between 0.5 and 1.0 mol per mol of phenol originally present, after which the reaction is continued to completion in the alkaline stage. By such procedure the total time required may be reduced to from 5 to 10 hours, or thereabout. The acid catalyst is added to the initial reaction charge as aqueous solution in amount on the order of about 0.05 to 0.15 mol per mol of phenol. In converting from the acid to the alkaline stage, the acid may be neutralized with ammonia, if desired, in which case alkali metal hydroxide is then added in amount required to raise the alkalinity of the neutralized mixture to the desired degree.

The reaction product made by either modification of procedure, when examined at high magnification (e. g. 24,000×) in an electron microscope, exhibits a peculiarity of structure not observed in phenol-aldehyde condensation products made outside of the stated range of proportions and conditions. This structure is characterized by numerous well defined small dense spherical nuclei, which appear to be active condensation centers. The usual type of water-soluble heat-hardenable phenol-formaldehyde resin, made with an alkaline catalyst, does not have this characteristic nucleated structure, but in the electron microscope appears to consist of large irregularly shaped areas without well defined boundaries. When such nucleated resin is mixed with a non-nucleated phenol-aldehyde resin, it apparently activates or catalyzes the condensation of the latter and causes curing in a shorter time than if the nucleated resin were not present. Possibly the nuclei act as a seed around which condensation of the mass proceeds at an accelerated rate. In the claims the term "nucleated" means having a structure showing nuclei as defined above, and the term "non-nucleated" means having a structure in which the said nuclei are absent.

Such nucleated resin, made as described, is not of itself a good adhesive, since it has too little penetrating power to form a strong bond with a wood surface. We have found, however, that the admixture of a low molecular weight water-soluble non-nucleated phenol-formaldehyde resin with the nucleated resin increases the penetrating power and forms an adhesive mixture which hardens or cures rapidly at a moderate temperature, giving a strong bond not only with dry, but also with wet, veneer.

THE BASE RESIN

The base resin to be used with our nucleated catalytic resin is an alkali-catalyzed water-soluble non-nucleated heat-hardening phenol-formaldehyde resin with colloidal aggregates of a wide range of molecular weight, which under the electron microscope appear as highly irregular areas of variable density. It is prepared from a mixture of the phenol, aqueous formaldehyde and aqueous alkali metal hydroxide, in which the mol ratio of formaldehyde to phenol is from 1.4 to 3.0, and of alkali metal hydroxide to phenol is between 0.5 and 1.0. The mixture is cooked under reflux at a temperature between 90° C. and the boiling point until a suitable viscosity, e. g. 200 to 500 centipoises, or more, is reached, with a resin solids content on the order of 30 to 40 per cent.

THE ADHESIVE MIXTURE

The catalytic and base resins, prepared as described, may be mixed at any time after their preparation, although in general it is most convenient to store them separately and mix them just prior to use. The proportions of the two resins may be varied according to the conditions under which they are to be used. For use with dry veneer (0 to 3 per cent moisture) as little as 10 parts of catalytic resin to 90 parts of base resin is satisfactory. For veneers containing 7 to 10 per cent moisture preferred proportions are 20 to 30 parts of catalytic resin and 80 to 70 parts of base resin. Such mixtures are suitable as well for dry veneers. Larger proportions of catalytic resin may be used, up to about 80 per cent, but with little or nor further advantage. There should always be a substantial proportion of base resin in the mixture, preferably 20 per cent or more, in order to develop the desired adhesive properties of the mixture.

The mixing of the two resins can be done by any usual means, in a vessel provided with mechanical stirrer. In making the mix a filler, such as wood flour, is usually added to increase body of the mixture to a suitable spreading consistency, and water may be added, if necessary, to adjust the resin solids content of the mix to the desired degree. A typical formulation for dry veneers is the following, in parts by weight:

Formulation I

| | |
|---|---|
| Catalytic resin | 10 |
| Base resin | 90 |
| Water | 20 |
| Walnut shell flour | 15 |

A typical formulation for wet veneers (7 to 10 per cent moisture) is:

Formulation II

| | |
|---|---|
| Catalytic resin | 25 |
| Base resin | 75 |
| Walnut shell flour | 15 |

These formulations are suggestive merely, and not limiting. The proportions of components can be varied to suit particular conditions and in accordance with the solids content of the resins and the consistency desired in the mix.

The mixed adhesive is applied and spread in usual manner for making plywood assemblies. It is adaptable to considerable variation of assembly time, for example, from as low as 5 minutes to as much as 1 hour.

The appended examples show various formulas for making the mixed adhesives of the invention, accompanied by tests showing the adhesive properties of the mixtures for making plywood. For comparison, examples are given of the results obtained with phenolic adhesives of the prior art. For the purpose of making accurate comparisons, the tests were standardized in detail conforming to practice in the plywood industry.

In the "curing test" the phenolic resin solution, with 9 per cent of walnut shell flour added to it, is applied at the rate of 6 grams per 8" x 8" area (equivalent to 30 lbs./1000 sq. ft.) to one side of each of two 8" x 8" x 1/16" squares of dry Douglas fir veneer, which are then laid with grain direction at right angles and with the glue side bearing on opposite sides of an 8" x 8" x 1/8" square of the same veneer placed between them, forming a 1/4" dressed 3-ply assembly. Fifteen minutes after the glue is applied the assembly is placed in a steam-heated press set at the temperature of the test, and unless otherwise stated, a pressure of 175 pounds per square inch is applied for 5 minutes, after which the plywood piece is removed and allowed to cool to room temperature. Each plywood square is cut into 1" x 3 1/4" strips which are notched as described on page 5 of Commercial Standard CS45–47, and the shear strength tested (1) on the dry specimen, (2) after 20 hours' soaking in cold water and (3) after 4 hours' immersion in boiling water. The tests reported are the average of at least 4 strips in each test. The ruptured surface of each test specimen is measured to obtain an estimate of the total area of the break in which the failure was caused by a split in the wood rather than by cleavage of the glue from the wood, and is reported as "per cent wood failure." The values shown in the tabulated results are expressed as two numbers joined by a hyphen (e. g. 278–85), the first number (278) being the pounds per square inch shear strength and the second number (85) being the per cent wood failure. For practical purposes either a shear strength of 200 or more, or a per cent wood failure of 85 or more, is considered to be good.

In the "wet veneer gluing test" Douglas fir veneer test specimens are used which are conditioned to a moisture content of 7 to 9 per cent. To the phenolic resin solution 15 per cent of walnut shell flour is added. The plywood assembly is laid up with 5 plies 12" x 12", the center ply being 1/16" and the other four 1/8" thick, only the three inner plies being glued together, with glue applied at the rate of 30 lbs./1000 sq. ft. After a certain time the assembly is hot-pressed according to times and temperatures as shown in the tables. The glued panels are stacked hot and allowed to cool slowly for 3 hours, then tested for shear strength as described above under the "curing test."

EXAMPLE 1

For purpose of comparison four resins were made according to the prior art and tested in the manner described above. These resins were essentially non-nucleated when examined in the electron microscope.

A. A mixture was made consisting of phenol (90 per cent), 37 per cent aqueous formaldehyde and 50 per cent aqueous sodium hydroxide in the following proportions:

| Material | Amount | Mols | Mol ratio |
|---|---|---|---|
| Phenol (90%) | 214.2 gm | 2.05 | 1 |
| CH₂O (37%) | 457.0 cc | 6.15 | 3 |
| NaOH (50%) | 123.2 gm | 1.54 | 0.75 |

The mixture was heated on a steam bath under reflux for 30 minutes, the cooked mixture having a viscosity of 938 centipoises at 90° F. (32° C.).

B. A mixture was made containing:

| | |
|---|---|
| Phenol (90%) | 410.3 gm., 3.93 mols |
| CH₂O (37%) | 716.0 gm., 8.84 mols |
| NaOH (50%) | 47.2 gm., 0.59 mol |

The mixture was heated at refluxing temperature for 70 minutes, when it was partially cooled and the following materials added:

| | |
|---|---|
| NaOH (50%) | 141.4 gm., 1.77 mols |
| NH₃ (28%) | 8.9 gm. |
| H₂O | 102.0 gm. |

The resulting solution contained 37 per cent of resin solids, the mol ratio of phenol–CH₂O–NaOH being 1–2.25–0.6.

C. A mixture was made containing:

| | |
|---|---|
| Phenol (90%) | 407.7 gm., 3.90 mols |
| CH₂O (37%) | 950.0 gm., 11.70 mols |
| NaOH (50%) | 93.6 gm., 1.17 mols |

The mixture was heated at reflux temperature for 45 minutes, cooled and held at 84° C. for 12 minutes, again cooled and held at 68° C. for 17 minutes, and then heated at 80° C. for 10 minutes. At this point further alkali was added, as follows:

| | |
|---|---|
| NaOH (50%) | 93.6 gm., 1.17 mols |
| NH₃ (28%) | 99.1 gm. |
| H₂O | 12.0 gm. |

This gave a resin solution of 37 per cent solids content having a viscosity of 101 centipoises at 90° F. The mol ratio of phenol–CH₂O–NaOH was 1–3–0.6.

D. The following quantities of material were taken:

| | |
|---|---|
| Phenol (100%) | 422.6 gm., 4.50 mols |
| CH₂O (37%) | 730.0 gm., 9.00 mols |
| NaOH (50%) | 338.0 gm., 4.22 mols |

To a mixture of the phenol and formaldehyde was added one-tenth of the sodium hydroxide solution, and the mixture heated at a refluxing temperature while the remainder of the sodium hydroxide solution was added in nine equal portions 10 minutes apart, with 70 grams of dilution water added at the end. The final viscosity was 340 centipoises after a total cooking time of 2 hours and 45 minutes at refluxing temperature. The mol ratio of phenol–CH₂O–NaOH was 1–2–0.94.

The above four resins were tested according to the curing test previously described, with results as shown in Table I.

Table I

| Resin | Press temp., ° C. | Shear strength and percent wood failure | | |
|---|---|---|---|---|
| | | Dry | Cold water | Boiling water |
| A | 110 | 149–21 | 120–5 | 110–6 |
| A | 120 | 220–60 | 160–17 | 187–52 |
| A | 130 | 230–67 | 239–64 | 194–73 |
| B | 110 | 155–92 | 133–30 | 117–70 |
| B | 120 | 285–100 | 258–70 | 238–63 |
| B | 130 | 253–98 | 225–52 | 203–55 |
| C | 110 | 273–90 | 150–10 | 205–58 |
| C | 120 | 223–83 | 252–57 | 278–85 |
| C | 130 | 347–90 | 330–58 | 237–77 |
| D | 110 | 93–0 | | 153–42 |
| D | 120 | 185–95 | 168–40 | 193–82 |
| D | 130 | 205–98 | 242–94 | 272–96 |

Resins B and C were subjected to the wet veneer gluing test as described, with assembly times varying from 10 to 45 minutes, and pressed for 6 minutes at 140° C. All samples were completely delaminated. Resin D was also subjected to the wet veneer test at 132° C., the samples likewise being delaminated.

EXAMPLE 2

A catalytic resin was prepared from the following materials:

| Material | Amount | Mols | Mol ratio |
|---|---|---|---|
| | Gm. | | |
| Phenol (90%) | 320.6 | 3.08 | 1 |
| CH₂O (37%) | 623.0 | 7.69 | 2.5 |
| NaOH (50%) | 173.0 | 2.16 | .7 |

The materials were mixed and the mixture cooked at 60° C. until its viscosity was 197 centipoises, when 340 cc. of water was added to bring the resin solids content to 30 per cent.

A base resin was prepared from the following materials:

| Material | Amount | Mols | Mol ratio |
|---|---|---|---|
| | Gm. | | |
| Phenol (90%) | 399.3 | 3.82 | 1 |
| CH₂O (37%) | 558.0 | 6.88 | 1.8 |
| NaOH (50%) | 287.0 | 3.59 | 0.94 |
| H₂O | 296.0 | | |

These materials were mixed and cooked under reflux at 90° to 95° C. until the viscosity of the mixture was 220 centipoises.

A mixture was made consisting of 20 per cent of the catalytic resin and 80 per cent of the base resin, which was used to make up plywood panels from both dry and wet veneers for test according to the procedures described. The results of the curing test on panels made from dry veneers are shown in Table II(a), and of the gluing test on panels made from wet veneers in Table II(b).

*Table II(a)*

| Press temp., ° C. | Shear strength and percent wood failure | | |
|---|---|---|---|
| | Dry | Cold water | Boiling water |
| 110 | 236-71 | 190-38 | 205-95 |
| 120 | 280-93 | 248-95 | 225-100 |
| 130 | 296-98 | 257-90 | 220-95 |

*Table II(b)*

| Assembly time, min. | Press | | Shear strength and percent wood failure | | |
|---|---|---|---|---|---|
| | Time, min. | Temp., ° C. | Dry | Cold water | Boiling water |
| 10 | 6 | 140 | 235-67 | 152-77 | 113-60 |
| 25 | 6 | 140 | 240-92 | 185-92 | 127-73 |
| 45 | 6 | 140 | 243-57 | 158-50 | 152-32 |

EXAMPLE 3

A catalytic resin was prepared from the following materials:

| Material | Amount | Mols | Mol ratio |
|---|---|---|---|
| | Gm. | | |
| Phenol | 284 | 3.02 | 1.0 |
| CH₂O (37%) | 858 | 10.60 | 3.5 |
| NaOH (50%) | 170 | 2.13 | .705 |
| H₂O | 418 | | |

The materials were mixed and cooked at 60° C. until a viscosity of 200 centipoises was reached. 20 parts of this resin was mixed with 80 parts of the base resin of Example 2, to form a composite adhesive. Plywood panels were prepared from veneers of 8 per cent moisture content and subjected to the gluing test as described, with results as shown in Table III.

*Table III*

| Assembly time, min. | Press | | Shear strength and percent wood failure | | |
|---|---|---|---|---|---|
| | Time, min. | Temp., ° C. | Dry | Cold water | Boiling water |
| 10 | 6 | 140 | 327-87 | 238-48 | 193-88 |
| 25 | 6 | 140 | 227-97 | 215-82 | 185-96 |
| 45 | 6 | 140 | 275-98 | 225-62 | 207-96 |

EXAMPLE 4

A catalytic resin was prepared with meta-cresol as the phenol constituent. The materials were mixed in the following proportions:

| Material | Amount | Mols | Mol ratio |
|---|---|---|---|
| | Gm. | | |
| m-Cresol | 305.4 | 2.83 | 1 |
| CH₂O (37%) | 658.0 | 8.12 | 2.87 |
| NaOH (50%) | 183.0 | 2.29 | .81 |
| H₂O | 392.0 | | |

The mixture was heated at 60° C. until the viscosity was 85 centipoises. 20 parts of this resin was mixed with 80 parts of the base resin of Example 2, and the mixed adhesive was tested in the same manner described in the preceding examples, with results as shown in Tables IV(a) and IV(b).

*Table IV(a).—Curing test*

| Press temp., ° C. | Shear strength and percent wood failure | | |
|---|---|---|---|
| | Dry | Cold water | Boiling water |
| 110 | 208-87 | 148-28 | 175-88 |
| 120 | 180-100 | 153-100 | 132-85 |
| 130 | 242-98 | 192-99 | 174-97 |

*Table IV(b).—Wet veneer test*

| Assembly time, min. | Press | | Shear strength and percent wood failure | | |
|---|---|---|---|---|---|
| | Time, min. | Temp., ° C. | Dry | Cold water | Boiling water |
| 10 | 6 | 127 | 199-83 | 240-96 | 253-98 |
| 10 | 6 | 132 | 258-98 | 230-96 | 233-99 |

EXAMPLE 5

A catalytic resin was prepared from a mixture of phenol and meta-cresol, the materials being mixed in the following proportions:

| Material | Amount | Mols | Mol ratio |
|---|---|---|---|
| | Gm. | | |
| Phenol | 201.7 | 2.15 | 1.0 |
| Cresol | 100.0 | .926 | |
| CH₂O (37%) | 623.0 | 7.68 | 2.5 |
| NaOH (50%) | 181.0 | 2.26 | .73 |
| H₂O | 391.0 | | |

This mixture was cooked at 60° C. until the viscosity was 125 centipoises. 20 parts of the resin was mixed with 80 parts of the base resin of Example 2, and plywood test specimens were prepared in the manner already described and tested according to the wet veneer gluing test, with results as shown in Table V.

*Table V*

| Assembly time, min. | Press | | Shear strength and percent wood failure | | |
|---|---|---|---|---|---|
| | Time, min. | Temp., °C. | Dry | Cold water | Boiling water |
| 10 | 6 | 127 | 313-92 | 267-83 | 255-83 |
| 10 | 6 | 132 | 262-95 | 225-85 | 228-96 |

EXAMPLE 6

A base resin was prepared from a mixture of the following materials:

| Material | Amount | Mols | Mol ratio |
|---|---|---|---|
| | Gm. | | |
| Phenol (90%) | 214.2 | 2.05 | 1.0 |
| CH₂O (37%) | 333.0 | 4.10 | 2.0 |
| NaOH (50%) | 154.0 | 1.93 | .94 |
| H₂O | 166.0 | | |

The mixture was refluxed at boiling temperature until its viscosity was 246 centipoises. Plywood test specimens were prepared as previously described from (1) the base resin alone, (2) 10 parts of the catalytic resin of Example 2 and 90 parts of the base resin, and (3) 30 parts of the same catalytic resin and 70 parts of the base resin. These samples were subjected to the curing test at temperatures of 110°, 120° and 130° C., with results as shown in Table VI.

*Table VI*

| Resin | Press temp., °C. | Shear strength and percent wood failure | | |
|---|---|---|---|---|
| | | Dry | Cold water | Boiling water |
| 1 | 110 | 190-75 | 129-4 | 141-24 |
| 1 | 120 | 185-95 | 166-40 | 160-71 |
| 1 | 130 | 180-99 | 185-100 | 181-100 |
| 2 | 110 | 212-97 | 185-60 | 166-100 |
| 2 | 120 | | 185-95 | 177-100 |
| 2 | 130 | | 182-95 | 171-100 |
| 3 | 110 | 215-100 | 186-100 | 171-100 |
| 3 | 120 | 235-94 | | 184-90 |
| 3 | 130 | 217-98 | 183-94 | 166-99 |

The results show that the base resin (No. 1) did not cure completely until heated at 130 C. under the test conditions, whereas the composite resins of the invention (Nos. 2 and 3) cured at 110° C.

EXAMPLE 7

To show the superiority of the composite adhesive of the invention as compared with the catalytic resin alone under the wet veneer gluing test, plywood specimens were prepared from (1) the catalytic resin of Example 3 alone and (2) a mixture of 20 parts of this catalytic resin and 80 parts of the base resin of Example 2, and submitted to the test, with results as shown in Table VII.

*Table VII*

| Resin | Assembly time, min. | Press | | Shear strength and percent wood failure | | |
|---|---|---|---|---|---|---|
| | | Time, min. | Temp., °C. | Dry | Cold water | Boiling water |
| 1 | 10 | 6 | 140 | 152-62 | 98-50 | 92-50 |
| 1 | 25 | 6 | 140 | 173-73 | 112-42 | 98-63 |
| 2 | 10 | 6 | 140 | 327-87 | 238-48 | 193-88 |
| 2 | 25 | 6 | 140 | 227-97 | 215-82 | 185-96 |
| 2 | 45 | 6 | 140 | 275-98 | 225-62 | 207-96 |

EXAMPLE 8

A catalytic resin was prepared by procedure in which the condensation was initiated in acid medium and completed in alkaline medium. The initial charge consisted of the following:

| Material | Amount | Mols | Mol ratio |
|---|---|---|---|
| | Gm. | | |
| Phenol (100%) | 306 | 3.26 | 1 |
| CH₂O (37%) | 792 | 9.78 | 3 |
| HCl (12N) | 6.13 | .168 | .05 |

The materials were mixed and heated at 60° C. with stirring for 7 hours. Then 392 cc. of water and 196.8 gm. of 50 per cent NaOH solution were added, to give a resin solids content of 30 per cent, and an excess of 0.7 mol NaOH per mol of phenol after neutralization of the acid. The addition of water and NaOH solution reduced the previously viscous mixture to a viscosity of 30 centipoises. Heating was continued at 60° C. for 5 hours until the viscosity was 100 centipoises.

This resin was mixed with the base resin of Example 2 in proportion of 20 parts of the former to 80 parts of the latter, and the mixture was used to prepare plywood panels which were submitted to the wet veneer gluing test, with results as shown in Table VIII.

*Table VIII*

| Assembly time, min. | Press | | Shear strength and percent wood failure | | |
|---|---|---|---|---|---|
| | Time, min. | Temp., °C. | Dry | Cold water | Boiling water |
| 10 | 5 | 127 | 253-70 | 202-38 | 238-85 |
| 10 | 6 | 127 | 282-89 | 240-81 | 212-82 |
| 10 | 5 | 132 | 219-81 | 191-88 | 160-89 |
| 10 | 6 | 132 | 215-99 | 130-97 | 130-100 |

EXAMPLE 9

This test was run to study the effect of varying the ratio of formaldehyde to phenol in the base resin upon the properties of the mixed resin obtained by mixing with a particular catalytic resin. A catalytic resin was prepared from the following materials:

| Material | Amount | Mols | Mol ratio |
|---|---|---|---|
| | Gm. | | |
| Phenol (100%) | 1142 | 12.17 | 1 |
| CH₂O (37%) | 2960 | 36.5 | 3 |
| NaOH (50%) | 686 | 8.58 | .7 |

The materials were mixed and heated at 60° C. for 22 hours until a viscosity of 140 centipoises was reached. A series of base resins was prepared from the same materials, in which the mol ratio of formaldehyde to phenol was 1.4, 1.7, 2.0, 2.5 and 3.0, respectively, and the mol ratio of NaOH to phenol in each case was 0.94. The mixtures were cooked at reflux temperature until the viscosity increased to about 400 centipoises. Mixtures were made containing 20 parts of the catalytic resin and 80 parts of the respective base resin, plywood panels were prepared from dry and from wet veneers, respectively, by pressing at 200 pounds/square inch, and subjected to the curing test and the wet veneer gluing test, with results as shown in Tables IX(a) and IX(b), respectively.

*Table IX(a).—Curing test*

| $CH_2O$/Phenol ratio of base resin | Press temp., °C. | Shear strength and percent wood failure | | |
|---|---|---|---|---|
| | | Dry | Cold water | Boiling water |
| 1.4 | 120 | 220–100 | 120–95 | 117–97 |
| 1.7 | 120 | 172–100 | 162–98 | 137–98 |
| 2.0 | 120 | 233–100 | 176–92 | 160–98 |
| 2.5 | 120 | 148–98 | 148–93 | 140–98 |
| 3.0 | 120 | 230–99 | 149–73 | 148–94 |

*Table IX(b).—Wet veneer test*

[Assembly time—10 minutes.]

| $CH_2O$/Phenol ratio of base resin | Press | | Shear strength and percent wood failure | | |
|---|---|---|---|---|---|
| | Time, min. | Temp., °C. | Dry | Cold water | Boiling water |
| 1.4 | 6 | 127 | 96–19 | 159–60 | 118–36 |
| 1.7 | 6 | 127 | 245–92 | 148–88 | 143–93 |
| 2.0 | 6 | 127 | 239–88 | 205–90 | 183–90 |
| 2.5 | 6 | 127 | 218–76 | 198–96 | 188–78 |
| 3.0 | 6 | 127 | 220–97 | 175–97 | 274–83 |

The values obtained in the curing test on plywood made from dry veneer do not vary greatly, and the same is true in the gluing test on plywood made from wet veneers, except in the case of the panels made with adhesive containing the base resin having a 1.4 $CH_2O$/phenol ratio, where the values are definitely lower.

EXAMPLE 10

The effect of varying the proportions of a catalytic resin and a base resin upon the adhesive properties of the mixed resin is shown in this test. A base resin was prepared from the following materials:

| Material | Amount | Mols | Mol ratio |
|---|---|---|---|
| | Gm. | | |
| Phenol (100%) | 1,092 | 11.63 | 1 |
| $CH_2O$ (37%) | 1,603 | 19.8 | 1.7 |
| NaOH (50%) | 875 | 10.9 | .94 |
| $H_2O$ | 1,010 | | |

The mixture was refluxed for 5.75 hours until the viscosity was 430 centipoises. This base resin was mixed in different proportions with the catalytic resin of Example 9, as shown in the table, plywood panels were made from wet veneers of 8 per cent moisture content, with 10 minute assembly time and pressed at 200 pounds/square inch for 6 minutes at 132° C. The test results are given in Table X.

*Table X*

| Parts | | Shear strength and percent wood failure | | |
|---|---|---|---|---|
| Base resin | Catalytic resin | Dry | Cold water | Boiling water |
| 100 | -------- | 185–30 | 103–3 | [1] 217–70 |
| 95 | 5 | 280–35 | 250–45 | [2] |
| 90 | 10 | 230–95 | 165–95 | 138–95 |
| 80 | 20 | 212–98 | 177–97 | 142–99 |
| 70 | 30 | 300–96 | 258–98 | 211–96 |
| 55 | 45 | 200–92 | 118–96 | 126–97 |
| 40 | 60 | 283–96 | 148–95 | 183–92 |
| 20 | 80 | 255–92 | 173–92 | 137–82 |
| -------- | 100 | 249–60 | 206–20 | 175–30 |

[1] Panel blistered.
[2] Delaminated.

With 100 parts of base resin in the adhesive the panel blistered and the portions that did stick had low per cent wood failure. The panel put together with a mixture containing 5 per cent of the catalytic resin also blistered and the portions which did stick in testing showed low wood failures, and the test strips also delaminated in boiling water. In both cases the poor bond resulted probably on account of insufficient cure together with an excessive migration of resin from the glue line, caused by the thinning effect of the veneer moisture. All mixtures containing from 90 to 20 parts of the base resin, and from 10 to 80 parts of the catalytic resin produced panels having a high per cent of wood failure and from fair to high shear strength. The panels made with 100 parts of the catalytic resin, on the other hand, showed a low value for per cent wood failure, due to poor penetration.

It is sometimes advantageous to include a small amount of starch or a native protein, i. e. one of vegetable or animal origin, in the mixture of materials used for preparing the catalytic resin. Example of such protein are casein and soyabean alpha protein. Such additive does not materially change the adhesive properties of the resins made by mixing the catalytic resin with a base resin, but it improves the water dispersability of the resin. A typical formula for making such a resin is:

| Material | Amount | Mols | Mol ratio |
|---|---|---|---|
| | Gm. | | |
| Phenol (90%) | 330.3 | 3.163 | 1 |
| Soya-bean protein | 14.9 | | |
| $CH_2O$ (37%) | 641.0 | 7.91 | 2.5 |
| NaOH (50%) | 178.4 | 2.23 | .7 |
| $H_2O$ | 383.0 | | |

The mixture is cooked at a temperature below 70° C. to a suitable viscosity in the manner previously described. When mixed in suitable proportion with a base resin an adhesive is obtained having equivalent properties to those shown in the examples herein, for application to dry or wet veneers.

We claim:

1. A water-soluble phenolic resinous composition, characterized by having a nucleated structure and adapted to be mixed with a non-nucleated alkaline phenolic resinous composition to produce an adhesive capable of forming on curing a strongly bonded plywood from wet veneers, which consists essentially of alkali metal hydroxide and the condensation product of a reactive phenol containing no substituents in positions ortho or para to the hydroxyl group with from 2.25 to 3.5 molar proportions of formaldehyde, the alkali metal hydroxide being in proportion of from 0.5 to 1.0 mol per mol of the phenol, such condensation product being formed by heating the reactants in the presence of water and a condensation catalyst at a temperature below 70° C. sufficient to cause condensation of the phenol and formaldehyde, the reaction being at least completed in the presence of the specified amount of alkali metal hydroxide to a viscosity of from 10 to about 350 centipoises measured at 25° C. and a resin solids content of 30 per cent.

2. A water-soluble phenolic resinous composition, characterized by having a nucleated structure and adapted to be mixed with a non-nucleated alkaline phenolic resinous composition to produce an adhesive capable of forming on curing a strongly bonded plywood from wet veneers, which consists essentially of sodium hydroxide and the condensation product of a reactive phenol containing no substituents in positions ortho or para to the hydroxy group with from 2.25 to 3.5 molar proportions of formaldehyde, the sodium hydroxide being in proportion of from 0.5 to 1.0 mol per mol of the phenol, such condensation product being formed by heating the reactants in the presence of water and a condensation catalyst at a temperature below 70° C. sufficient to cause condensation of the phenol and formaldehyde, the reaction being at least completed in the presence of the specified amount of sodium hydroxide to a viscosity of from 10 to about 350 centipoises measured at 25° C. and a resin solids content of 30 per cent.

3. A water-soluble phenolic resinous composition, characterized by having a nucleated structure and adapted to be mixed with a non-un-cleated alkaline phenolic resinous composition to produce an adhesive capable of forming on curing a strongly bonded plywood from wet veneers, which consists essentially of the reaction product formed by heating a reactive phenol containing no substituents in positions ortho or para to the hydroxyl group with from 2.25 to 3.5 molar proportions of formaldehyde in aqueous mixture in the presence of from 0.5 to 1.0 molar proportion of sodium hydroxide at a temperature below 70° C. sufficient to cause condensation of the phenol and formaldehyde to a viscosity of from 10 to about 350 centipoises measured at 25° C. and a resin solids content of 30 per cent.

4. The method of making a nucleated water-soluble phenolic resin, which comprises forming an aqueous mixture of a reactive phenol containing no substituents in positions ortho or para to the hydroxyl group with from 2.25 to 3.5 molar proportions of formaldehyde and from 0.5 to 1.0 molar proportion of alkali metal hydroxide and heating the mixture at a reaction temperature below 70° C. sufficient to cause condensation of the phenol and formaldehyde, to a viscosity of from 10 to about 350 centipoises measured at a temperature of 25° C. and a resin solids content of 30 per cent.

5. Method according to claim 4, in which the alkali metal hydroxide is sodium hydroxide.

6. Method according to claim 4, in which the reaction temperature is approximately 60° C.

7. The method of making a nucleated water-soluble phenolic resin, which comprises forming an aqueous mixture of a reactive phenol containing no substituents in positions ortho or para to the hydroxyl group with from 2.25 to 3.5 molar proportions of formaldehyde, acidifying with mineral acid, heating the mixture at a reaction temperature below 70° C. until partial condensation occurs but not so long that alkali-insoluble resin is formed, adding alkali metal hydroxide in amount sufficient to neutralize the acid and form an excess of alkali of from 0.5 to 1.0 molar proportion relative to the phenol originally employed, and continuing the reaction at a temperature below 70° C. to a viscosity of from 10 to about 350 centipoises measured at a temperature of 25° C. and a resin solids content of 30 per cent.

8. Method according to claim 7, in which the mineral acid is hydrochloric acid.

9. Method according to claim 7, in which the alkali metal hydroxide is sodium hydroxide.

10. Method according to claim 7, in which the reaction is carried out at a temperature of approximately 60° C.

11. A water-soluble phenolic resin adhesive consisting essentially of 100 parts of a mixture of (a) from 20 to 90 parts of an essentially non-nucleated base resin, which is the condensation product prepared by heating an aqueous mixture of a reactive phenol containing no substituents in positions ortho or para to the hydroxyl group with from 1.4 to 3.0 mols of formaldehyde and from 0.5 to 1.0 mol of alkali metal hydroxide per mol of the phenol at a temperature between 90° C. and the boiling point of the reaction mixture to a viscosity of from 200 to 500 centipoises measured at 25° C. and a resin solids content of 30 per cent, and (b) from 80 to 10 parts of a nucleated catalytic resin, which is the condensation product prepared by heating an aqueous mixture of such reactive phenol with from 2.25 to 3.5 mols of formaldehyde per mol of the phenol and a condensation catalyst at a temperature below 70° C. sufficient to cause condensation of the phenol and formaldehyde, the reaction being at least completed in the presence of from 0.5 to 1.0 mol of alkali metal hydroxide per mol of the phenol to a viscosity of from 10 to about 350 centipoises measured at 25° C. and a resin solids content of 30 per cent.

12. A water-soluble phenolic resin adhesive consisting essentially of 100 parts of a mixture of (a) from 20 to 90 parts of an essentially non-nucleated base resin, which is the condensation product prepared by heating an aqueous mixture of a reactive phenol containing no substituents in positions ortho or para to the hydroxyl group with from 1.4 to 3.0 mols of formaldehyde and from 0.5 to 1.0 mol of alkali metal hydroxide per mol of the phenol at a temperature between 90° C. and the boiling point of the reaction mixture to a viscosity of from 200 to 500 centipoises measured at 25° C. and a resin solids content of 30 per cent, and (b) from 80 to 10 parts of a nucleated catalytic resin, which is the condensation product prepared by heating an aqueous mixture of such reactive phenol with from 2.25 to 3.5 mols of formaldehyde per mol of the phenol and from 0.5 to 1.0 mol of alkali metal hydroxide per mol of the phenol at a temperature below 70° C. sufficient to cause condensation of the phenol and formaldehyde until the viscosity of the mixture is from 10 to about 350 centipoises measured at 25° C. and a resin solids content of 30 per cent.

13. A water-soluble phenolic resin adhesive consisting essentially of 100 parts of a mixture of (a) from 20 to 90 parts of an essentially non-nucleated base resin, which is the condensation product prepared by heating an aqueous mixture of phenol with from 1.4 to 3.0 mols of formaldehyde and from 0.5 to 1.0 mol of sodium hydroxide per mol of phenol at a temperature between 90° C. and the boiling point of the reaction mixture to a viscosity of from 200 to 500 centipoises measured at 25° C. and a resin solids content of 30 per cent, and (b) from 80 to 10 parts of a nucleated catalytic resin, which is the condensation product prepared by heating an aqueous mixture of phenol with from 2.25 to 3.5 mols of formaldehyde per mol of phenol and a condensation catalyst at a temperature of approximately 60° C., the reaction being at least completed in the presence of from 0.5 to 1.0 mol of sodium hydroxide per mol of the phenol to a viscosity of from 10 to about 350 centipoises measured at 25° C. and a resin solids content of 30 per cent.

14. A water-soluble phenolic resin adhesive consisting essentially of 100 parts of a mixture of (a) from 20 to 90 parts of an essentially non-nucleated base resin, which is the condensation product prepared by heating an aqueous mixture of phenol with from 1.4 to 3.0 mols of formaldehyde and from 0.5 to 1.0 mol of sodium hydroxide per mol of phenol at a temperature between 90° C. and the boiling point of the reaction mixture to a viscosity of from 200 to 500 centipoises measured at 25° C. and a resin solids content of 30 per cent, and (b) from 80 to 10 parts of a nucleated catalytic resin, which is the condensation product prepared by heating an aqueous mixture of phenol with from 2.25 to 3.5 mols of formaldehyde per mol of phenol and from 0.5 to 1.0 mol of sodium hydroxide at a temperature of approximately 60° C. until the viscosity of the mixture is from 10 to about 350 centipoises measured at 25° C. and a resin solids content of 30 per cent.

15. Plywood bonded with the adhesive defined in claim 11.

16. Plywood bonded with the adhesive defined in claim 12.

17. Plywood bonded with the adhesive defined in claim 13.

18. Plywood bonded with the adhesive defined in claim 14.

PAUL G. SCHRADER.
ALEX. M. PARTANSKY.

REFERENCES CITED

The following references are of record in the file of this patent:

UNITED STATES PATENTS

| Number | Name | Date |
|---|---|---|
| 2,091,183 | Murray et al. | Aug. 24, 1937 |
| 2,351,716 | Smith | June 20, 1944 |
| 2,360,376 | Van Epps | Oct. 17, 1944 |
| 2,485,527 | Cardwell | Oct. 18, 1949 |